D. A. ST. GERMAIN.
SLEEPING EYES MOUNTING FOR DOLLS.
APPLICATION FILED MAY 13, 1918.
1,276,590.
Patented Aug. 20, 1918.
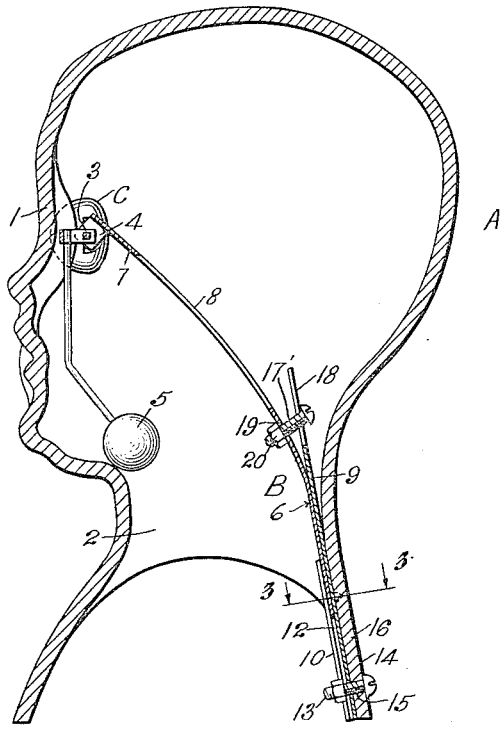
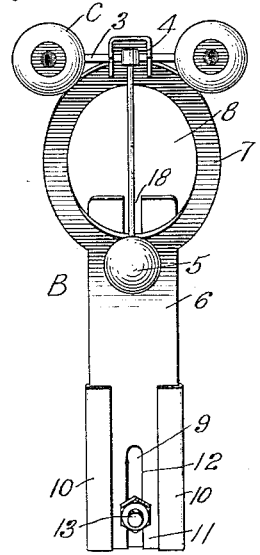
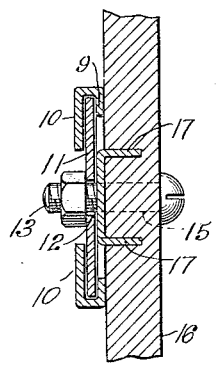
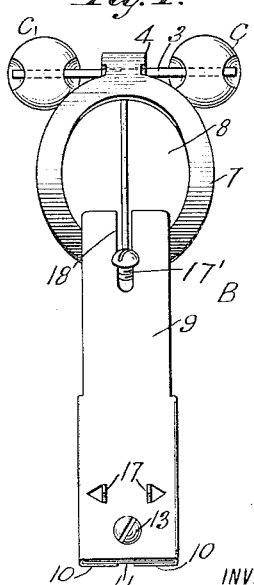
WITNESSES
Frank J. Faggiani
C. Bradway
INVENTOR
Don A. St. Germain
BY
ATTORNEYS

UNITED STATES PATENT OFFICE.

DON A. ST. GERMAIN, OF NEW YORK, N. Y., ASSIGNOR TO M. SCHEUER & BRO., OF NEW YORK, N. Y., A COPARTNERSHIP.

SLEEPING-EYES MOUNTING FOR DOLLS.

1,276,590.

Specification of Letters Patent.   Patented Aug. 20, 1918.

Application filed May 13, 1918.   Serial No. 234,304.

*To all whom it may concern:*

Be it known that I, DON A. ST. GERMAIN, a citizen of the United States, and a resident of the city of New York, Richmond Hill, borough of Queens, in the county of Queens and State of New York, have invented a new and Improved Sleeping-Eyes Mounting for Dolls, of which the following is a full, clear, and exact description.

This invention relates to dolls and has to deal more particularly with a mounting for the eyes.

The invention has for its general objects to improve and simplify the construction of sleeping eyes mountings so as to be comparatively simple and inexpensive to manufacture, reliable and efficient in use, and so designed as to be easily and quickly attached in proper position in the head of the doll.

A more specific object of the invention is the provision of a mounting having adjustable means whereby the proper set of the eye with respect to the eye socket of the head can be easily and quickly obtained, the mounting including a yielding supporting member which permits the eyes to yield inwardly without any injury to the mounting, and capable of automatically restoring the eyes to normal position.

With such and other objects in view, the invention comprises various novel features of construction and arrangement of parts which will be set forth with particularity in the following description and claims appended hereto.

In the accompanying drawing which illustrates one embodiment of the invention and wherein similar characters of reference indicate corresponding parts in all the views, Figure 1 is a central vertical section of a doll's head with the eyes and mounting therein;

Fig. 2 is a front view of the eyes and mounting;

Fig. 3 is a detail sectional view on the line 3—3, Fig. 1; and

Fig. 4 is a rear view of Fig. 2.

Referring to the drawing, A designates a doll's head, which is shown as a one-piece structure and having the usual eye sockets 1, and disposed in the head is a mounting B for the eyes C.

The mounting and eyes constitute a unitary structure which is placed in the head through the open neck 2, the mounting being fastened to the back portion of the neck, as clearly shown in Fig. 1. The eyes C are fastened rigidly to a horizontal bar or shaft 3 which is journaled in a pair of bearing lugs 4, and depending from the center of the shaft 3 is a pendulum element or swinging weight 5.

The mounting comprises a curved resilient metal strip 6 which has an O-shaped upper extremity 7 which carries at its top the bearing lugs 4, the opening 8 of the said extremity 7 being so arranged that the weight 5 can swing freely without the resilient eye-supporting strip 6 interfering. A base or attaching member 9 has inwardly curved longitudinal flanges 10 under which the lower end 11 of the strip 6 engages. In other words, the supporting or base member 9 has a socket in which the strip 6 is slidably disposed for the purpose of adjustment. In the lower end of the strip 6 is a vertical slot 12 through which extends a bolt 13 which also extends through an opening 14 in the base member and an opening 15 in the back portion 16 of the doll's head, said bolt serving to secure the mounting in the head and to hold the strip 6 in any desired position of vertical adjustment. To prevent lateral movement of the mounting the base member 9 has spurs 17 stamped out therefrom which enter the composition of the doll, as shown in Fig. 3, so that a single fastening suffices to secure the mounting firmly in place. It is necessary to adjust the upper part 7 of the member 6 so that the eyes will not frictionally engage the walls of their sockets. For this purpose an adjusting device in the form of a bolt 17' is employed. The bolt engages in the upper slotted end 18 of the base member 9 and passes through an opening 19 in the member 6. By tightening the nut 20 of the bolt the upper end of the member 6 is drawn rearwardly so as to remove the eyes out of contact with the eye sockets of the member. If the eyes are too far to the rear the nut is loosened so that the eyes can come forward. The adjustment of the bolt 17 is preferably effected before the mounting is placed in the head by trials, and when the proper position is obtained the attaching bolt 13 is securely fastened.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a doll's head having eye sockets, an adjustable resilient member attached to the back neck portion of the head and extending upwardly to a point centrally between the eye sockets, and eyes mounted on the member at opposite sides thereof and disposed in the sockets.

2. The combination of a doll's head having eye sockets, an adjustable resilient member attached to the back neck portion of the head and extending upwardly to a point centrally between the eye sockets, eyes mounted on the member at opposite sides thereof and disposed in the sockets, said eyes being movable and said member having an opening, and a swinging weight connected with the eyes and movable through the opening as the head is tilted.

3. The combination of a head having eye sockets, eyes in the sockets, and a spring member supporting the eyes, means for supporting the member to permit vertical adjustment of the eyes, and means for adjusting the member to horizontally adjust the eyes.

4. The combination of a head having eye sockets, eyes in the sockets, a pendulum device connected with the eyes for rocking the same, a yielding member forming a support for the eyes, an attaching base fastened in the head, means for securing the member to the base in different positions of vertical adjustment, and an adjusting device for moving the upper end of the member back and forth to adjust the position of the eyes in the eye sockets.

5. The combination of a head having an open neck and having eye sockets, eyes in the said sockets, and a supporting device for the eyes disposed in the head and fastened to the back of the neck, said device including a yielding member adjustable vertically and having an upper eye-supporting portion adjustable up and down or back and forth horizontally.

6. A device of the class described comprising an attaching base formed with a socket, a resilient member slidable in the socket, means for securing the resilient member in different positions of adjustment in the socket, eyes on the member, a pendulum device for moving the eyes, said member having its upper portion bent away from the base, and an adjustable device securing the base to the bent portion of the member to adjust the upper eye-holding extremity of the member.

7. The combination of a doll's head having eye sockets, eyes in the said sockets, a pendulum connected with the eyes for moving the same, a supporting member for the eyes, an attaching base having spurs adapted to embed in the wall of the head, a bolt coöperating with the spurs to hold the base in fixed position, said bolt serving to adjustably support the member on the attaching base, and additional means for adjusting the position of the supporting member.

DON A. ST. GERMAIN.